United States Patent
Griepentrog

(10) Patent No.: US 7,096,533 B2
(45) Date of Patent: Aug. 29, 2006

(54) LOCKING ROLLER FOR AN ARTICLE OF FURNITURE

(75) Inventor: Dennis G. Griepentrog, DePere, WI (US)

(73) Assignee: Kruegar International, Inc., Green Bay, WI (US)

( * ) Notice: Subject to any disclaimer, the term of this patent is extended or adjusted under 35 U.S.C. 154(b) by 0 days.

(21) Appl. No.: 10/866,573

(22) Filed: Jun. 12, 2004

(65) Prior Publication Data
US 2005/0273973 A1    Dec. 15, 2005

(51) Int. Cl.
*B60B 33/00* (2006.01)
(52) U.S. Cl. .................... 16/35 R; 16/44; 280/86.751
(58) Field of Classification Search ............... 16/35 R, 16/30, 34, 64, 43, 18 A; 248/188.9, 188.8, 248/188; 280/11.205, 47.38, 86.751; 188/1.12, 188/25
See application file for complete search history.

(56) References Cited

U.S. PATENT DOCUMENTS

| | | | |
|---|---|---|---|
| 1,064,244 A | | 6/1913 | Neugebauer |
| 1,137,329 A | * | 4/1915 | Johnson ..................... 188/72.8 |
| 1,152,687 A | | 9/1915 | Acton |
| 1,749,751 A | | 3/1930 | Bergsten |
| 1,873,347 A | | 8/1932 | Smart |
| 2,025,448 A | | 12/1935 | Hebbinghaus |
| 2,059,420 A | | 11/1936 | Ward, Jr. |
| 2,434,863 A | * | 1/1948 | Parkhill ..................... 81/3.35 |
| 2,613,389 A | | 10/1952 | Cramer |
| 2,709,827 A | | 6/1955 | Volz |
| 2,767,420 A | | 10/1956 | Riccio |
| 2,770,831 A | | 11/1956 | Angelica et al. |
| 2,808,607 A | | 10/1957 | Urso |
| 2,885,720 A | * | 5/1959 | Seeberger ..................... 16/44 |
| 2,911,226 A | * | 11/1959 | Grieder ..................... 280/1.183 |
| 2,942,290 A | * | 6/1960 | Segal ......................... 16/35 R |
| 2,942,698 A | * | 6/1960 | Bolinger ..................... 188/176 |
| 2,980,944 A | * | 4/1961 | Bolinger ..................... 16/35 R |
| 3,025,930 A | * | 3/1962 | Segal ........................... 188/74 |
| 3,102,298 A | * | 9/1963 | Sheahan ........................ 16/44 |
| 3,349,425 A | | 10/1967 | Rabelos |
| 3,699,609 A | | 10/1972 | Spatz |
| 3,796,169 A | * | 3/1974 | Bales et al. ................ 108/116 |
| 4,077,086 A | | 3/1978 | Butler |
| 4,086,680 A | * | 5/1978 | Kelly ............................ 16/30 |
| 4,102,172 A | * | 7/1978 | Iiyoshi ........................ 72/254 |

(Continued)

FOREIGN PATENT DOCUMENTS

GB        2127287 A  *  4/1984

(Continued)

*Primary Examiner*—Chuck Y. Mah
(74) *Attorney, Agent, or Firm*—Boyle, Fredrickson, Newholm, Stein & Gratz, S.C.

(57) ABSTRACT

A locking roller assembly includes a housing adapted for mounting to an article of furniture. A wheel is rotatably mounted to the housing via a mounting arrangement that accommodates relative vertical movement between the wheel and the housing. The wheel is mounted to an axle, which in turn is secured to an axle carrier. A biasing member, such as a spring, is engaged between the housing and the axle carrier to bias the housing toward a raised position. When a load is applied to the article of furniture, the spring is compressed so as to allow the housing to move vertically downward toward the wheel. The housing includes an engagement surface that engages the wheel when the load is applied and the housing is moved downwardly, to prevent rotation of the wheel and to thereby prevent movement of the article of furniture.

27 Claims, 2 Drawing Sheets

U.S. PATENT DOCUMENTS

| | | |
|---|---|---|
| 4,166,516 A | 9/1979 | Thurmond, Jr. |
| 4,700,430 A | 10/1987 | Raftery |
| 4,821,369 A * | 4/1989 | Daniels ................ 16/35 R |
| 5,001,808 A | 3/1991 | Chung |
| 5,259,088 A | 11/1993 | Yang |
| 5,355,550 A * | 10/1994 | Yang ....................... 16/44 |
| 5,421,636 A | 6/1995 | Gamble |
| 5,551,712 A * | 9/1996 | Repucci ............. 280/11.205 |
| 5,617,934 A * | 4/1997 | Yang ..................... 188/1.12 |
| 6,357,077 B1 * | 3/2002 | Jones et al. ................ 16/44 |
| 6,473,935 B1 | 11/2002 | Cherukuri |
| 6,719,256 B1 | 4/2004 | Rydell et al. |

FOREIGN PATENT DOCUMENTS

JP      03266702 A  *  11/1991

* cited by examiner

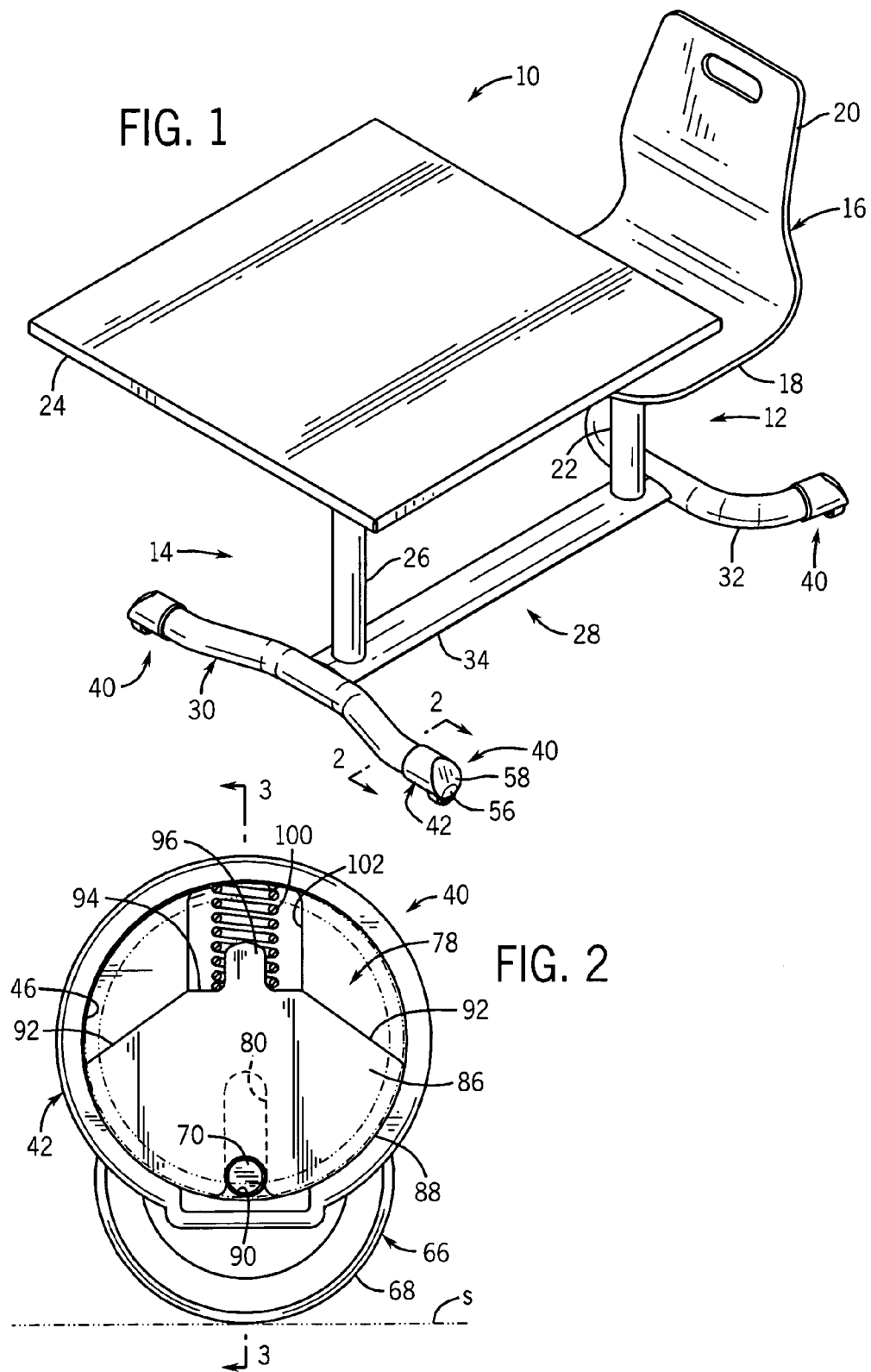

LOCKING ROLLER FOR AN ARTICLE OF FURNITURE

BACKGROUND AND SUMMARY OF THE INVENTION

This invention relates to a caster or roller for mounting to an article of furniture to provide movement of the article of furniture on a support surface such as a floor, and more particularly to a caster or roller assembly having a locking feature for selectively preventing movement of the article of furniture on the support surface.

A caster or roller is commonly mounted to an article of furniture to enable the article of furniture to be moved on a support surface such as a floor. Typically, the caster or roller includes a wheel or roller member, which engages the support surface and rotates so as to enable movement of the article of furniture on the support surface.

Certain types of casters or rollers include a locking feature for selectively preventing rotation of the wheel or roller member, to selectively prevent movement of the article of furniture on the support surface. Some locking rollers have a lever that is movable between a locking position and a release position. The lever selectively actuates and releases a locking mechanism that is configured to prevent rotation of the wheel or roller member when actuated. Other types of locking mechanisms have a self-locking feature, which prevents rotation of the wheel or roller member when a load is placed on the article of furniture. Self-locking rollers of this type are used when it is desired to automatically prevent movement of the article of furniture at certain times, such as to maintain a chair in position when an occupant is in the seat of the chair, and to allow ease of movement of the article of furniture at all other times, e.g. when the chair is unoccupied.

It is an object of the present invention to provide a self-locking roller assembly for use with an article of furniture such as a chair. Another object of the invention is to provide such a self-locking roller assembly which is well suited for use with an article of furniture having a base that includes a laterally extending base member to which the roller assembly is mounted. Yet another object of the invention is to provide such a self-locking roller assembly which includes a uniquely configured housing having an engagement surface for selectively preventing rotation of the wheel or roller member of the roller assembly. A still further object of the invention is to provide such a self-locking roller assembly which is relatively simple in its components and construction, so as to provide ease of assembly and manufacture, yet which is configured to effectively prevent rotation of the wheel or roller member when a load is placed on the article of furniture.

In accordance with the present invention, a locking roller assembly for use with an article of furniture includes a housing defining an interior within which a wheel or roller member is located. The housing includes an opening through which a lower portion of the wheel extends, for engagement with a support surface such as a floor. The wheel or roller member is mounted to an axle. A movable mounting arrangement is interposed between the housing and the axle, for providing movement of the housing relative to the axle between a raised position and a lowered position. A biasing arrangement is interposed between the housing and the axle, for biasing the housing toward the raised position. The housing includes an engagement surface in vertical alignment with the wheel. When the article of furniture is not loaded, the biasing arrangement maintains housing in the raised position in which the engagement surface is positioned out of engagement with the wheel, so that the wheel is freely rotatable to provide movement of the article of furniture on the support surface. When a load or other downward force is applied to the article of furniture, the housing is moved downwardly relative to the wheel toward the lowered position, against the force of the biasing arrangement. Such downward movement of the housing causes the engagement surface to move into contact with the wheel, to prevent rotation of the wheel and to thereby prevent movement of the article of furniture when the article of furniture is loaded. When the load on the article of furniture is removed, the biasing force of the biasing arrangement functions to move the housing toward the raised position, which moves the engagement surface out of engagement with the wheel. In this manner, the article of furniture can then be freely moved on the support surface as long as the load on the article of furniture is relieved.

The axle is engaged with the housing via a guide arrangement that guides vertical movement of the axle as the housing is moved between the lowered position and the raised position. The axle guide arrangement is preferably in the form of a pair of slots formed in spaced apart walls that at least in part define the housing interior, and which are configured to receive end portions of the axle. The slots are vertically oriented, so that the slots guide vertical movement of the axle as the housing is moved between the lowered and raised positions.

The housing includes a laterally extending passage, which is configured to receive a component of the article of furniture for use in mounting the roller assembly to the article of furniture. The housing includes an end wall that is in line with the laterally extending passage, and which is configured to at least in part define the interior of the housing. The engagement surface is defined by an inner surface of the end wall.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is an isometric view of a representative article of furniture incorporating the locking roller assembly of the present invention;

FIG. 2 is a section view taken along line 2—2 of FIG. 1;

DETAILED DESCRIPTION OF THE INVENTION

Figure 3:
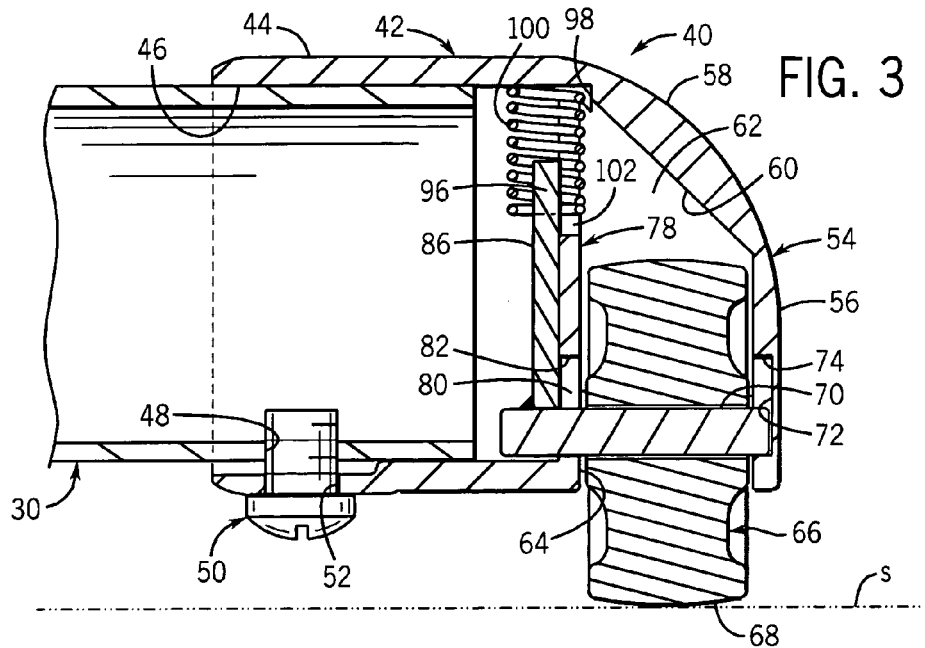
FIG. 3 is a section view taken along line 3—3 of FIG. 2, showing a housing of the locking roller assembly in a raised position for enabling movement of the article of furniture.

Referring to FIG. 1, an article of furniture in the form of a combination chair and desk assembly 10 generally includes a chair section 12 and a desk section 14. Chair section 12 includes a chair 16 having a seat 18 and a back 20, and is supported by a chair support pedestal 22. Desk section 14 includes a desk top 24 supported by a vertical desk top support 26. A base assembly 28 is configured to engage a support surface such as a floor, so as to support chair and desk assembly 10 on the support surface and to provide a stable support for chair section 12 and desk section 14 of chair and desk assembly 10. Base assembly 28 is configured to secure chair section 12 and desk section 14 together in a fixed relationship. Generally, base assembly 28 includes a transverse front support member 30, a generally U-shaped rear support member 32, and an axial center support member 34 that extends between and interconnects front support member 30 and rear support member 32. The lower ends of chair support pedestal 22 and desk support 26 are secured to center support member 34, for fixing chair section 12 and desk section 14 to base assembly 28.

A locking roller assembly 40, in accordance with the present invention, is mounted to each end of front support member 30 and rear support member 32. In a manner to be explained, each locking roller assembly 40 facilitates movement of chair and desk assembly 10 when chair section 12 is unoccupied, and selectively prevents movement of chair and desk assembly 10 when a user is seated in chair section 12.

Figure 4:
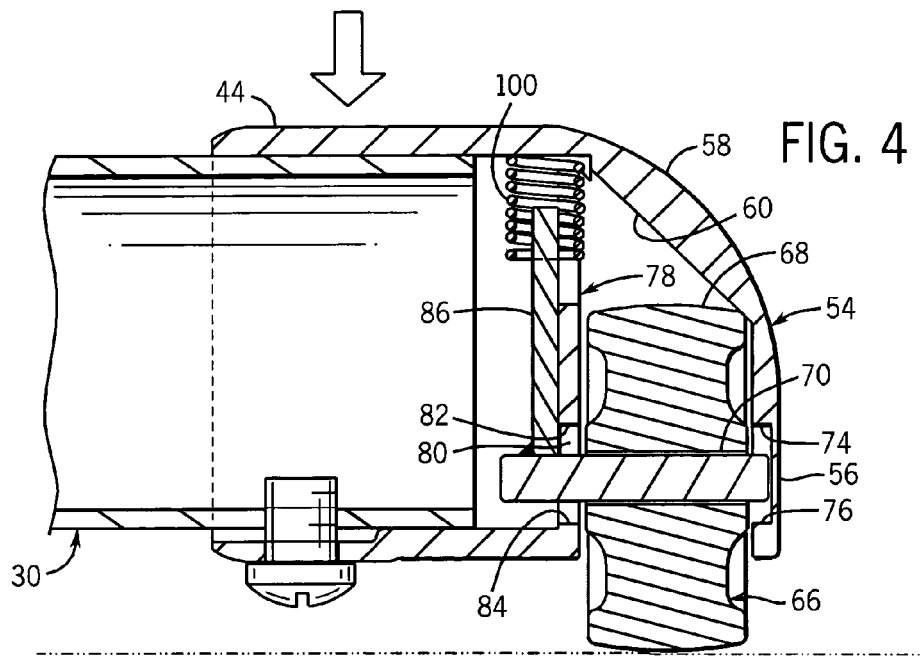
FIG. 4 is a view similar to FIG. 3, showing movement of the housing to a lowered position and engagement of the wheel or roller member of the roller assembly with an engagement surface defined by the housing so as to prevent movement of the article of furniture.

Referring to FIGS. 2–4, each locking roller assembly 40 includes a housing 42, which includes a generally tubular mounting section 44 configured to receive and engage the end portion of front support member 30 or rear support member 32. Tubular mounting section 44 includes an annular wall that defines a laterally open passage 46, which forms a portion of the interior of housing 42. Passage 46 is configured so as to enable an end portion of either front support member 30 or rear support member 32 to be received and engaged within passage 46. A threaded opening 48 is formed in the lower area of each support member end portion. Threaded opening 48 is configured to receive the threads of a fastener, such as a screw 50, which extends through an opening 52 in the lower area of tubular mounting section 44. Engagement of the threads of screw 50 within threaded opening 48 functions to selectively mount locking roller assembly 40 to the end portion of the support member.

Housing 42 further includes an end wall 54, which is formed so as to define a vertical lower section 56 and a sloped section 58 that extends between vertical lower section 56 and the wall of housing 42 that defines tubular mounting section 44. The inner surface of sloped section 58 defines a generally planar engagement surface 60. An inner portion of the interior of housing 42, shown at 62, is defined by the inner surfaces of sloped section 58, including engagement surface 60.

The end portion of housing 42 includes a downwardly facing opening 64. A wheel or roller member 66 is disposed within the end portion of the interior of housing 42, and defines a lower portion that extends through opening 64 so that wheel or roller member 66 engages a support surface S, such as a floor. Wheel 66 defines a circular outer surface 68, and includes a central transverse passage through which an axle 70 extends. The outer end portion of axle 70 extends outwardly from the outer side surface of wheel 68, and is received within a recess 72 formed in the inner surface of the lower section 56 of housing end wall 54. A suitable retainer, such as a snap ring or the like (not shown), is engaged with the outer end portion of axle 70 to maintain axle 70 in engagement within the central transverse passage of wheel 66 within which axle 70 is received. Recess 72 has a width slightly greater than, and in closed tolerance to, the diameter of axle 70, and defines a vertically extending slot having an upper edge 74 and a lower edge 76.

Housing 42 further includes a guide wall 78 that separates passage 46 of tubular mounting section 44 and inner portion 62 of the interior of housing 42. Guide wall 78 includes a vertical slot 80 having a width slightly greater than, and in closed tolerance to, the diameter of axle 70, and which defines an upper edge 82 and a lower edge 84. Guide wall slot 80 is in lateral alignment with recess 72, and is shaped similarly so that recess upper edge 74 and slot upper edge 82 are at generally the same elevation, and recess lower edge 76 and slot lower edge 84 are at generally the same elevation. The inner end portion of axle 70 extends through guide wall slot 80.

The inner end portion of axle 70 that extends through guide wall slot 80 and inwardly of guide wall 78 is rigidly mounted to an axle carrier 86. Axle carrier 86 includes an arcuate lower edge 88 within which a recess 90 is formed, and which is configured to receive the inner end portion of axle 70. Axle carrier 86 and axle 70 may be rigidly interconnected in any satisfactory manner, such as by welding. Axle carrier 86 is a generally planar member, defining an outer surface located adjacent and engaged with an inner surface defined by guide wall 78.

Arcuate edge 88 of axle carrier 86 has a shape corresponding to that of the inner surface of the wall of housing mounting section 44. Axle carrier 86 further includes a pair of angled side edges 92 that extend inwardly from lower edge 88, and an upper edge 94 located between side edges 92. A retainer tab 96 extends upwardly from upper edge 94, so that upper edge 94 defines a pair of upwardly facing shoulders located one on either side of retainer tab 96.

The inner surface of tubular mounting section 44 of housing 42 is formed so as to define a laterally facing shoulder 98 located outwardly of guide wall 78. A biasing member, in the form of a spring 100, bears between axle carrier 86 and the inner surface of the wall of mounting section 44 adjacent shoulder 98. Spring 100 is in the form of a coil spring having an internal passage, and retainer tab 96 of axle carrier 86 extends into the lower area of the passage of spring 100. With this construction, the shoulders defined by the areas of upper edge 94 adjacent retainer tab 96 engage the lower extent of spring 100. Spring 100 thus biases housing 42 upwardly relative to axle carrier 86, toward a position as shown in FIGS. 2 and 3, in which axle 70 is in a lowered position in engagement with lower edge 76 of recess 72 and lower edge 84 of slot 80. Guide wall 78 includes a recess 102, which is configured to receive the outer portion of spring 110 that is located outwardly of axle carrier 86.

In operation, each locking roller assembly 40 functions as follows to selectively fix chair and desk assembly 10 in position. When chair section 16 of chair and desk assembly 10 is unoccupied, the biasing force of spring 100 urges housing 42 upwardly relative to axle carrier 86 to the position as shown in FIGS. 2 and 3, and as described immediately above. The upward force of spring 100 applies an upward force to the support member of chair and desk assembly 10 that is mounted to locking roller assembly 40, to bring lower edges 76, 84 of recess 72 and slot 80, respectively, into engagement with axle 70. In this position, engagement surface 60 of housing end wall 54 is moved away from wheel outer surface 68, such that wheel 66 is freely rotatable within the interior of housing 42. Wheel 66 thus enables chair and desk assembly 10 to be moved on support surface S to a desired position.

When a user is seated in chair section 12 of chair and desk assembly 10, the weight of the user applies a downward force to base assembly 28 through seat support pedestal 22.

The downward force on base assembly 28 in turn applies a downward force to each locking roller assembly 40, which overcomes the upward biasing force of each locking roller assembly spring 100. For each locking roller assembly 40, the downward force functions to move the locking roller assembly housing 42 downwardly against the biasing force of each spring 100. Such downward movement of the housing 42 moves the engagement surface 60 downwardly toward and into engagement with roller outer surface 68, as shown in FIG. 4. Such downward movement of housing 42 relative to its associated wheel 66 is accommodated by recess 72 and slot 80, which enable axle 70 to remain stationary by virtue of engagement of outer surface 68 of wheel 66 with support surface S.

During movement of housing 42 relative to axle 70, wheel 66 is maintained in an upright position by engagement of the end portions of axle 70 within recess 72 and slot 80. Furthermore, inner portion 62 of the housing interior has a width only slightly greater than the width of roller 66, such that the sides of wheel 66 are located closely adjacent the outer surface of guide wall 78 and the inner surface of housing end wall lower section 56. With this construction, engagement of roller outer surface 68 by engagement surface 60 causes slight lateral movement of wheel 66 due to the angle of engagement surface 60, which causes wheel 66 to shift toward and into engagement with guide wall 78. Engagement surface 60 thus wedges against roller outer surface 68, to prevent rotation of wheel 66 until the load on chair section 12 of chair and desk assembly 10 is relieved.

While the invention has been shown and described with respect to a particular embodiment, it is contemplated that various alternatives and modifications are contemplated as being within the scope of the present invention. For example, and without limitation, while the locking roller assembly has been shown and described with respect to engagement with the base of an article of furniture via a laterally open passage defined by the housing of the locking roller assembly, it is understood that any other satisfactory mechanism for mounting the locking roller assembly housing to the article of furniture may be employed, e.g. via a vertical passage, an upstanding mounting projection, or the like. The engagement surface defined by the end wall of the housing may be formed with any desired shape, e.g. a concave or convex shape, and is not limited to the planar configuration as shown and described. In addition, while the housing has been shown as having a round or circular construction, it is also understood that the housing may be formed to have a square cross section, or any other shape. The biasing arrangement may be any type of biasing arrangement that urges the housing toward its raised position, and is not limited to the coil spring as shown and described. Further, while the axle carrier has been shown as being mounted only to one end of the axle, it is also contemplated that the axle carrier may be mounted to both ends of the axle. In addition, while the engagement surface has been shown as being defined by the inside surface of an end wall of the housing, it is also understood that the engagement surface may be defined by an internal surface of the housing that is in vertical alignment with the wheel. It should also be understood that the locking roller assembly of the present invention may be used in combination with any article of furniture that is capable of supporting a load, such as a table, desk, chair, stood or the like, and is not limited to use with a combination chair and desk as shown and described.

Various alternatives and embodiments are contemplated as being within the scope of the following claims particularly pointing out and distinctly claiming the subject matter regarded as the invention.

I claim:

1. A locking roller assembly for an article of furniture, comprising:
    a housing defining an interior;
    a wheel located in the interior of the housing, wherein the wheel is rotatably mounted to an axle that extends along a longitudinal axis;
    an axle guide arrangement associated with the housing for guiding vertical movement of the housing relative to the axle between a lowered position and a raised position;
    a biasing arrangement interconnected with the axle for biasing the housing toward the raised position;
    a wheel engagement area within the housing interior; and
    a wheel engagement surface movable with the housing, wherein the wheel engagement surface is configured to engage the wheel when the housing is moved to the lowered position, and wherein the wheel engagement surface is further configured to move the wheel laterally along the longitudinal axis of the axle into engagement with the wheel engagement area when the wheel engagement surface engages the wheel to inhibit rotation of the wheel.

2. The locking roller assembly of claim 1, wherein the wheel engagement surface comprises a laterally facing angled surface that engages an outer surface defined by the wheel when the housing is moved to the lowered position, wherein the wheel engagement surface is spaced above the outer surface of the wheel when the housing is in the raised position.

3. The locking roller assembly of claim 2, wherein the wheel engagement area comprises a wall spaced from the wheel engagement surface, and wherein the axle guide arrangement includes a generally vertical inner slot formed in the wall, in combination with an outer slot associated with the housing, wherein an inner end portion of the axle is received within the inner slot and an outer end portion of the axle is received within the outer slot.

4. The locking roller assembly of claim 3, wherein the outer slot is formed in an end wall defined by the housing, wherein the end wall is located vertically below the wheel engagement surface.

5. The locking roller assembly of claim 4, wherein the inner end portion of the axle is mounted to an axle carrier, wherein the housing is movable upwardly and downwardly relative to the axle carrier when the housing is moved between the raised and lowered positions, respectively.

6. The locking roller assembly of claim 5, wherein the biasing arrangement comprises a spring that bears between the axle carrier and a facing spring engagement surface defined by the housing for biasing the housing toward the raised position.

7. The locking roller assembly of claim 6, wherein the axle carrier includes an upwardly extending projection that is engaged with a lower end defined by the spring, for maintaining the spring in engagement with the axle carrier.

8. A locking roller assembly for an article of furniture, comprising:
    a housing defining an interior;
    a wheel located in the interior of the housing, wherein the wheel is rotatably mounted to an axle;

an axle guide arrangement associated with the housing for guiding vertical movement of the housing relative to the axle between a lowered position and a raised position;

a biasing arrangement interconnected with the axle for biasing the housing toward the raised position; and a wheel engagement surface defined by the housing, wherein the wheel engagement surface is configured to engage the wheel when the housing is in the lowered position to inhibit rotation of the wheel, wherein the wheel engagement surface comprises an angled surface that engages an outer surface defined by the wheel when the housing is in the lowered position, wherein the wheel engagement surface is spaced above the outer surface of the wheel when the housing is in the raised position;

wherein the housing interior includes a wall spaced from the wheel engagement surface, and wherein engagement of the wheel engagement surface with the outer surface of the wheel functions to move the wheel laterally toward the wall, wherein the angle of the wheel engagement surface wedges the wheel between the wall and the wheel engagement surface to inhibit rotation of the roller when the housing is in the lowered position.

9. The locking roller assembly of claim 8, wherein the axle guide arrangement includes a generally vertical inner slot formed in the wall, in combination with an outer slot associated with the housing, wherein an inner end portion of the axle is received within the inner slot and an outer end portion of the axle is received within the outer slot.

10. The locking roller assembly of claim 9, wherein the outer slot is formed in an end wall defined by the housing, wherein the end wall is located vertically below the angled wheel engagement surface.

11. The locking roller assembly of claim 9, wherein the inner end portion of the axle is mounted to an axle carrier, wherein the housing is movable upwardly and downwardly relative to the axle carrier when the housing is moved between the raised and lowered positions, respectively.

12. The locking roller assembly of claim 11, wherein the biasing arrangement comprises a spring that bears between the axle carrier and a facing spring engagement surface defined by the housing for biasing the housing toward the raised position.

13. The locking roller assembly of claim 12, wherein the axle carrier includes an upwardly extending projection that is engaged with a lower end defined by the spring, for maintaining the spring in engagement with the axle carrier.

14. A locking roller assembly for an article of furniture, comprising:

a housing defining an interior, wherein the housing includes an engagement surface;

a wheel rotatably mounted to the housing in a fixed orientation relative to the housing, wherein the wheel is rotatable about an axis of rotation and wherein the housing is movable between a raised position and a lowered position relative to the wheel;

a biasing arrangement for biasing the wheel toward the lowered position; and a wheel engagement area within the interior of the housing, wherein the engagement surface is configured to engage the wheel when the housing is in the lowered position and to move the wheel laterally along the axis of rotation of the wheel into engagement with the wheel engagement area to inhibit rotation of the wheel.

15. The locking roller assembly of claim 14, wherein the engagement surface comprises an angled surface that engages an outer surface defined by the wheel when the housing is in the lowered position, wherein the angled engagement surface is spaced above the outer surface of the wheel when the housing is in the raised position.

16. A locking roller assembly for an article of furniture, comprising:

a housing defining an interior, wherein the housing includes an end wall defining an engagement surface, wherein the housing interior includes a laterally extending passage configured to receive a component of the article of furniture for use in mounting the locking roller to the article of furniture, and wherein the end wall is in alignment with the laterally extending passage;

a wheel rotatably mounted to the housing in a fixed orientation relative to the housing, wherein the housing is movable between a raised position and a lowered position;

a biasing arrangement for biasing the housing toward the raised position; and an engagement surface defined by the housing and at least in part defining the interior of the housing, wherein the engagement surface is configured to engage the wheel when the housing is in the lowered position to inhibit rotation of the wheel.

17. The locking roller assembly of claim 14, further comprising an axle guide arrangement associated with the housing for guiding vertical movement of the housing relative to the axle between the lowered position and the raised position.

18. The locking roller assembly of claim 17, wherein the axle guide arrangement includes an outer slot defined by the housing end wall, in combination with a guide wall spaced inwardly from the end wall, wherein the guide wall includes an inner slot in alignment with the outer slot, wherein an outer portion of the axle is engaged within the outer slot and an inner portion of the axle is engaged within the inner slot.

19. The locking roller assembly of claim 18, wherein the axle inner portion is mounted to an axle carrier located inwardly of the guide wall, and wherein the biasing arrangement comprises a spring that bears between the housing and the axle carrier for biasing the housing toward the raised position.

20. The locking roller assembly of claim 19, wherein the axle carrier comprises a generally planar member located adjacent the guide wall.

21. A locking roller assembly for an article of furniture, comprising:

a housing defining an interior and including a laterally extending passage for receiving a component of the article of furniture for use in mounting the locking roller to the article of furniture, wherein the housing includes an end wall, wherein the end wall is configured to close the passage and to at least in part define the interior of the housing, and wherein the end wall defines an engagement surface;

a wheel rotatably mounted within the interior of the housing, wherein the housing is movable relative to the wheel between a raised position and a lowered position; and a biasing arrangement for biasing the housing toward the raised position;

wherein movement of the housing to the lowered position from the raised position is operable to move the engagement surface into contact with the wheel to inhibit rotation of the wheel.

22. The locking roller assembly of claim 21, wherein the engagement surface comprises an angled surface that engages an outer surface defined by the wheel when the housing is in the lowered position, wherein the wheel engagement surface is spaced above the outer surface of the wheel when the housing is in the raised position.

23. The locking roller assembly of claim 21, further comprising an axle guide arrangement associated with the housing for guiding vertical movement of the housing relative to the wheel between the lowered position and the raised position.

24. The locking roller assembly of claim 23, wherein the axle guide arrangement includes an outer slot defined by the housing end wall, in combination with a guide wall spaced inwardly from the end wall, wherein the guide wall includes an inner slot in alignment with the outer slot, wherein an outer portion of the axle is engaged within the outer slot and an inner portion of the axle is engaged within the inner slot.

25. The locking roller assembly of claim 21, wherein the axle is mounted to an axle carrier located within the interior of the housing, and wherein the biasing arrangement comprises a spring configured to bear between the axle carrier and the housing for biasing the housing toward the raised position.

26. The locking roller assembly of claim 25, further comprising a guide arrangement associated with the housing for guiding vertical movement of the housing relative to the wheel between the raised and lowered positions.

27. The locking roller assembly of claim 26, wherein the guide arrangement includes a guide wall having a generally vertical inner guide slot within which an inner portion of the axle is received, and an outer guide slot in the end wall of the housing within which an outer portion of the axle is received, wherein the inner and outer guide slots are aligned with each other and are configured to engage the axle to guide movement of the housing relative to the axle.

* * * * *

UNITED STATES PATENT AND TRADEMARK OFFICE
CERTIFICATE OF CORRECTION

| | | |
|---|---|---|
| PATENT NO. | : 7,096,533 B2 | Page 1 of 1 |
| APPLICATION NO. | : 10/866573 | |
| DATED | : August 29, 2006 | |
| INVENTOR(S) | : Dennis G. Griepentrog | |

It is certified that error appears in the above-identified patent and that said Letters Patent is hereby corrected as shown below:

ON THE TITLE PAGE

(73) Assignee:

Delete "Kruegar" and substitute therefore -- Krueger --.

IN THE CLAIMS

Column 7, line 60, after "and" begin a new paragraph.

Signed and Sealed this

Twenty-eighth Day of November, 2006

JON W. DUDAS
*Director of the United States Patent and Trademark Office*